US008484117B2

(12) United States Patent
Weiss

(10) Patent No.: US 8,484,117 B2
(45) Date of Patent: **\*Jul. 9, 2013**

(54) MULTI-INPUT SYSTEM THAT MAKES INDEX-BASED ADJUSTMENTS

(75) Inventor: Allan N. Weiss, Medfield, MA (US)

(73) Assignee: Market Shield Capital, LLC, Natick, MA (US)

( * ) Notice: Subject to any disclaimer, the term of this patent is extended or adjusted under 35 U.S.C. 154(b) by 453 days.

This patent is subject to a terminal disclaimer.

(21) Appl. No.: 12/769,093

(22) Filed: Apr. 28, 2010

(65) Prior Publication Data

US 2010/0211526 A1 Aug. 19, 2010

Related U.S. Application Data

(63) Continuation of application No. 11/553,150, filed on Oct. 26, 2006, now Pat. No. 7,716,106, which is a continuation of application No. 10/794,465, filed on Mar. 5, 2004, now Pat. No. 7,155,468.

(60) Provisional application No. 60/453,075, filed on Mar. 7, 2003.

(51) Int. Cl.
*G06Q 40/00* (2012.01)

(52) U.S. Cl.
USPC .............................. 705/36 R; 705/35; 705/37

(58) Field of Classification Search
USPC ............................................. 705/35, 36 R, 37
See application file for complete search history.

(56) References Cited

U.S. PATENT DOCUMENTS

| 4,346,442 A | 8/1982 | Musmanno |
| 4,376,978 A | 3/1983 | Musmanno |
| 4,597,046 A | 6/1986 | Musmanno et al. |
| 4,674,044 A | 6/1987 | Kalmus et al. |
| 4,700,297 A | 10/1987 | Hagel, Sr. et al. |
| 4,774,663 A | 9/1988 | Musmanno et al. |
| 4,953,085 A | 8/1990 | Atkins |
| 5,083,782 A | 1/1992 | Nilssen |
| 5,126,936 A | 6/1992 | Champion et al. |
| 5,270,922 A | 12/1993 | Higgins |
| 5,297,032 A | 3/1994 | Trojan et al. |
| 5,671,363 A | 9/1997 | Cristofich et al. |

(Continued)

FOREIGN PATENT DOCUMENTS

| JP | 2002007691 | 1/2002 |
| WO | 95/06290 | 3/1995 |
| WO | 98/13778 | 4/1998 |
| WO | 2004/013793 | 2/2004 |

OTHER PUBLICATIONS

Shiller, R. J., et al., "Home Equity Insurance", National Bureau of Economic Research, Inc., Working Paper Series, Working Paper No. 4830 (Aug. 1994).

(Continued)

*Primary Examiner* — Lalita M Hamilton
(74) *Attorney, Agent, or Firm* — Onello & Mello, LLP

(57) ABSTRACT

A common index fund system and method enables investment in entities that is indexed to a common index, rather than individual company performance. For small business entities, the creation, issuance, trading and management of fund shares as a liquid investment may be accomplished with, for example, a relatively stable industry-based risk. The entities receive value from a pool and in return make payments into the pool in an amount that varies according to the index, which causes a corresponding change in the value of the shares.

20 Claims, 3 Drawing Sheets

U.S. PATENT DOCUMENTS

| | | | |
|---|---|---|---|
| 5,745,885 | A | 4/1998 | Mottola et al. |
| 5,765,144 | A | 6/1998 | Larche et al. |
| 5,781,654 | A | 7/1998 | Carney |
| 5,802,501 | A | 9/1998 | Graff |
| 5,806,048 | A | 9/1998 | Kiron et al. |
| 5,809,484 | A | 9/1998 | Mottola et al. |
| 5,812,988 | A | 9/1998 | Sandretto |
| 5,819,238 | A | 10/1998 | Fernholz |
| 5,826,243 | A | 10/1998 | Musmanno et al. |
| 5,890,141 | A | 3/1999 | Carney et al. |
| 5,950,175 | A | 9/1999 | Austin |
| 5,963,923 | A | 10/1999 | Garber |
| 5,987,435 | A | 11/1999 | Weiss et al. |
| 6,070,151 | A | 5/2000 | Frankel |
| 6,195,647 | B1 | 2/2001 | Martyn et al. |
| 6,249,775 | B1 | 6/2001 | Freeman et al. |
| 6,513,020 | B1 | 1/2003 | Weiss et al. |
| 7,155,468 | B2 | 12/2006 | Weiss |
| 7,599,886 | B1 | 10/2009 | Lambert |
| 7,716,106 | B2 | 5/2010 | Weiss |
| 2002/0082903 | A1 | 6/2002 | Yasuzawa |
| 2002/0091623 | A1 | 7/2002 | Daniels |
| 2002/0178111 | A1 | 11/2002 | Woodley |
| 2003/0083972 | A1 | 5/2003 | Williams |
| 2003/0110111 | A1 | 6/2003 | Nalebuff et al. |
| 2003/0110122 | A1 | 6/2003 | Nalebuff et al. |
| 2004/0054613 | A1 | 3/2004 | Dokken |
| 2004/0254871 | A1 | 12/2004 | Weiss |
| 2005/0216384 | A1 | 9/2005 | Partlow et al. |
| 2007/0043644 | A1 | 2/2007 | Weiss |
| 2010/0169205 | A1 | 7/2010 | Labuszewski et al. |

OTHER PUBLICATIONS

Shiller, R.J., "Macro Markets: Creating Institutions for Managing Society's Largest Economic Risks", Oxford University Press, Oxford (Clarendon Press 1993).

Case, K.E., et al., "Index-Based Futures and Options Markets in Real Estate", The Journal of Portfolio Management, pp. 83-92 (Winter 1993).

"The SuperTrust Trust for Capital Market Fund, Inc. Shares, et al; Notice of Application", 46 SEC-Docket 1170, Release No. IC-17613 (Jul. 25, 1990).

Kelleher, N., "The Small Business Page Cash-for-Settlement Industry: A new Idea Turns Structured Deals into Ready $$", Boston Herald, Boston, MA, Mar. 11, 1997, p. 019).

Shiller, Robert J., "The New Financial Order: Risk in the 21st Century", Princeton University Press, 2003.

Shiller, Robert J., et al., "Moral Hazard in Home Equity Conversion", Jan. 4, 1998, pp. 1-29.

"Bid.Com Receives CDN$3.1 Million From Acqua Wellington Private Placement," PR Newswire, New York: Jun. 20, 2000, p. 1.

MULTI-INPUT SYSTEM THAT MAKES INDEX-BASED ADJUSTMENTS

CROSS REFERENCES TO RELATED APPLICATIONS

This application is a continuation application that claims the benefit under 35 U.S.C. §120 of prior co-pending U.S. patent application Ser. No. 11/553,150, filed Oct. 26, 2006, entitled Common Index Securities, which claims the benefit under 35 U.S.C. §120 of prior U.S. patent application Ser. No. 10/794,465, filed Mar. 5, 2004, entitled Common Index Securities, now U.S. Pat. No. 7,155,468, issued Dec. 26, 2006, which claimed priority under 35 U.S.C. §119(e) to U.S. Provisional Patent Application Ser. No. 60/453,075, entitled Small Business Liquid Securities, filed Mar. 7, 2003.

FIELD OF THE INVENTION

The inventive concepts relate to systems and methods useful in the field of financial investments, and more particularly related to systems and methods for facilitating investment in securities tied to a common index, which may be applied to provide liquidity in small businesses.

BACKGROUND

In a typical scenario, some companies can achieve a degree of liquidity by offering shares in the company on a stock exchange. In such a case, an investment in the company comes with risks to the investor that are not only related to the industry, but also to the company itself. Such risk may stem from the potential of mismanagement of the company, loss of key employees, and so on. Individuals, or funds, may purchase shares in a variety of companies in an attempt to offset any idiosyncratic risks attributable to individual companies. But, in the end, the investors risk is still a function of the individual performance of the companies of which he owns shares.

While many companies can gain liquidity through "going public", some companies or other entities do not meet the investment communities requirements to do so. For example, in some situations, small business owners may desire to sell part of their business for diversification purposes or to raise capital to invest back into the business. This can be difficult with a small, privately held business. Capital markets are not open to the small businesses because of their size and lack of accounting audits. So this path remains unavailable to small businesses, while being quite available to many larger businesses.

Small businesses can sometimes sell a stake, ranging from a minority stake to up to a 100% stake, to private investors or private equity firms, but they tend to sell at a low price to earnings ratio. And, the terms of such investment can often be considered unattractive to the small business. For example, a certain amount of control of the small business may also be required in the exchange for capital from the investor. On the other hand, investors who might benefit through investments in these businesses do not have a convenient liquid way to do so. Typically, to buy into a small business an investor must go through a fairly involved and costly assessment process. And, selling the stake in the small business may also be a complicated and lengthy process.

SUMMARY OF THE INVENTION

A system for and method of providing a common index fund having shares (or common-indexed securities) representing a set of businesses or other entities (generally referred to as "entities" or "businesses" herein) is provided, with the value contributed by each represented entity tied to a common index (which may be a composite index comprised of a set of indices), rather than being tied to each entity's individual performance. The fund may be configured such that the entities receive upfront liquidity (or consideration) in exchange for subsequent consideration back to the fund with the magnitude of that subsequent consideration being a function of the index. The entities may be chosen from one or more defined classes of businesses. The classes could be industry based. For instance, such a class could be defined for oil companies, as just one example.

The common index securities and fund of the present invention, therefore, differ fundamentally from mutual funds or other composite funds. A typical mutual fund's performance is a function of the performance of each individual stock in the fund. The opposite is true with a common index fund, wherein the value of the fund, and each entity's stake in it, is a function of the common index thereby shielding the investor from individual company fraud or mismanagement aside from that which results in outright bankruptcy. Additionally, the companies represented in a typical mutual fund must be tradable securities. But the entities represented in a common index fund need not be liquid securities. And, the companies in a typical mutual fund do not receive upfront liquidity in exchange for follow-on consideration back to the mutual fund. But the entities in the common index fund can.

A set of shares is defined representing claims against the fund. The shares may be offered for trading publicly, held privately, or some combination thereof. Or, the shares could be offered or not offered in response to a given event or at periodic intervals. The fund may issue different classes of shares (e.g., common and preferred). Each class of shares may include its own set of terms with respect to the entities receiving that class of shares.

The present invention may also be used as a means for providing liquidity to otherwise illiquid entities. Such an entity is generally referred to herein as a "small business". Note, a "small business" as meant herein may include, but is not limited to, businesses defined by certain agencies or governmental regulations as a "small business" based on criteria relating to the size of the business, such as its number of employees, gross revenue, and so on. The phrase "small business" as used herein may also comprise: (1) any entity which is generally considered by the financial community as not suitable for an initial public offering (IPO) or public trading, (2) any entity which was once publicly traded, but has since been de-listed, (3) a subsidiary, division or affiliate of a business, even if that business is traded publicly or privately, (4) any entity not publicly traded, regardless of size or profitability, (5) a source of income flowing from one or more individuals or entities, (6) a partnership or joint venture, (7) a university or not-for-profit organization, or (8) any combination of the foregoing.

With respect to classes of businesses, at least one defined class may comprise an industry sector or sub-sector. A defined class may comprise a plurality of defined classes, sub-classes, or a combination thereof. A class may be defined geographically, regionally, politically, or nationally; or by size, dependency or suppliers; or according to any other criteria relevant to investors. As an example, a class of businesses may be natural gas distributors. A sub-class may be natural gas distributors in New England. Or, a class of businesses may be professional athletes and the sub-class could be professional baseball players, or a baseball team, division, or league, or one or more specifically named baseball players or positions. When defining a class, an index should also be defined or identified having a meaningful, i.e., value, correlation to the entities represented in the class.

Participating entities make payments to the fund in exchange for consideration back from the fund. The consideration to an entity represented in the fund may comprise cash, fund shares, or both, or perhaps other forms of consideration. The consideration may take the form, at least in part, of an initial pay-out to the entity, along with fund shares. This initial pay-out may be derived from a share earning value defined or predicted for the fund shares and an agreed to future payment stream to the fund by the entity.

The consideration to the fund from an entity may comprise an up-front buy-in payment in the form, for example, of equity. A promise by the business to give subsequent consideration will be required—all according to the terms established between the fund manager and the business. The subsequent consideration may take the form of regular or scheduled payments, e.g. quarterly payments, which will be initially set according to a formula, which includes the index as a parameter. The formula may be uniformly applied to all businesses or it, or parameters within it, may be negotiable. The formula may also include, for a given business, parameters representing or relating to earnings of the business (e.g. 10% of the previous years earnings).

According to the formula, subsequent payments to the fund are adjusted in response to the index. The index may be: (1) at least one or one or more industry indices; (2) a composite index; (3) an index derived from publicly traded companies in the at least one industry sector or derived from one or more economic indicators, interest rates, earnings, revenues, dividends or other financial indicators from one or more businesses represented in the fund, or (4) any combination of the foregoing. For example, a business that is earning $1,000,000 per calendar quarter may commit to paying the fund a starting amount of 10% (or 0.10) of earnings, or $100,000 in this case, per quarter. This regular payment would be adjusted each quarter by the change in an index relevant to the industry, such as an earnings index. Therefore, if in the next quarter profits rise 10% for that industry (or class or sub-class of industries), the business would pay $110,000 into the fund for the next quarter, i.e., 0.11×$1,000,000. These adjustments and payments continue during the term or in perpetuity, depending on the arrangement between the fund and business. Downward adjustments may also be accommodated or prohibited—depending on the upfront fund structure.

Because the amount of each entity's payment stream is responsive to changes in the index, the value of the fund, and its shares are also responsive to the index. The fund may have a defined fund term or may be open-ended. The holders of the shares may receive on-going value through appreciation of the fund and trading of the shares and/or through dividend payouts, or both. Distribution periods may be defined, wherein distributions by the fund may be determined at the close of each distribution period according to a pre-determined dividend formula. Dividends may then be disbursed in relation to the close of the distribution periods, in response to a change in fund earnings.

Depending on the structure of the fund, entities may be allowed to "buy-out" of the fund, e.g., prior to the end of a designated life or term of the fund, if any. And entities could be allowed to buy-in to the fund during the life or term of the fund, if any. Such buy-outs and buy-ins could be allowed at any time during the term of the fund or in response to satisfaction of a certain set of criteria, such as the profits of a business in the fund or a sector represented by the fund exceeding a threshold value. In some forms, rather than, or in addition to, a business's option to buy-in or buy-out of the fund, a fund manager may have the option to add and remove businesses at its discretion or in response to predefined criteria, such as the earnings of a business exceeding or falling below a threshold value, a change in an index or interest rates or a change in another relevant parameter. Typical reasons for removing a business from a fund may also include a business entering bankruptcy or becoming insolvent, actual or likely litigation involving the business or sector or sub-sector represented in the fund, or other risk altering events. To address such issues one or more entities represented in the fund, or the entire fund, may be backed by a guarantor, such as a third party guarantor.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
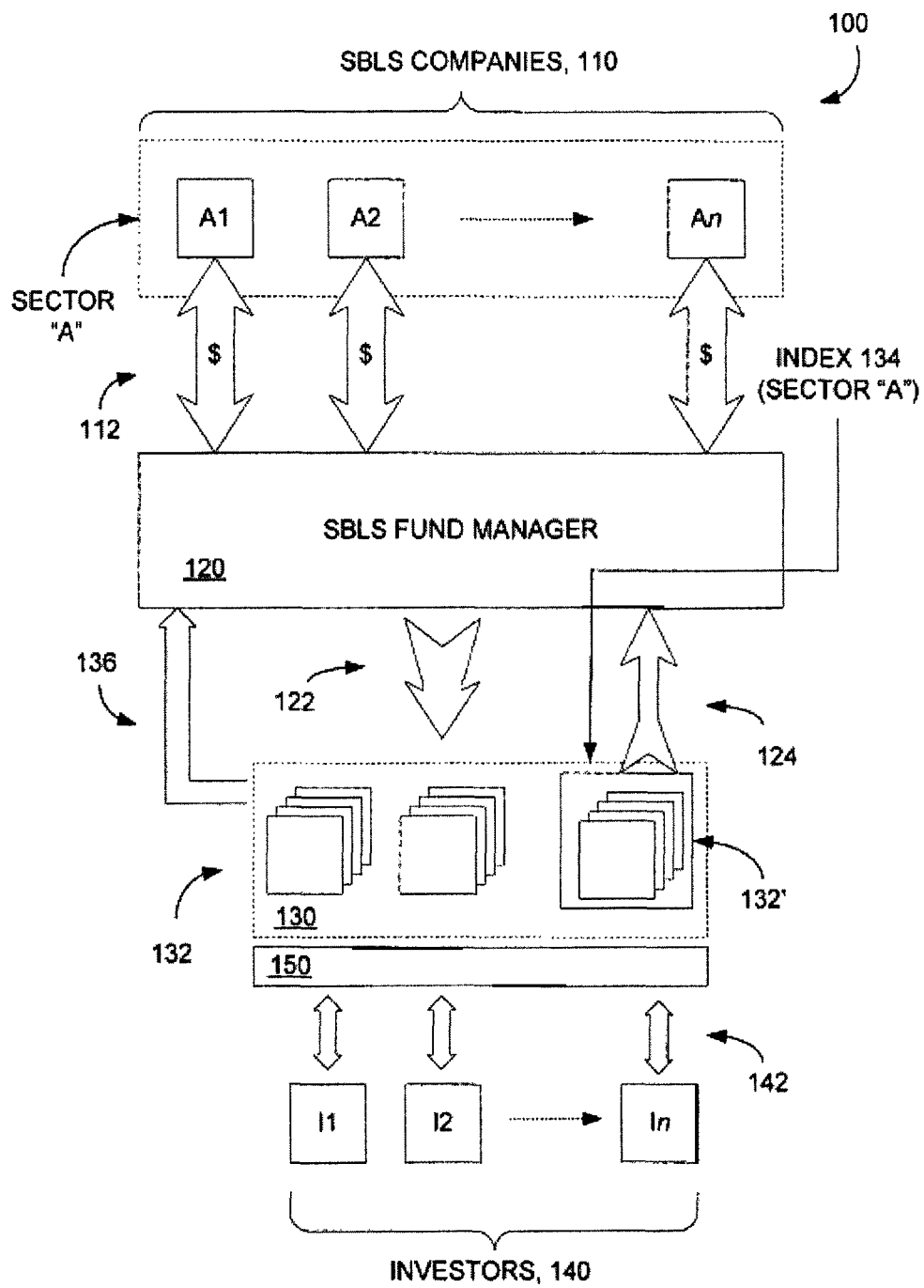
FIG. 1 is a block diagram of an embodiment of a common index securities system in accordance with the present invention.

A system for and method of providing a common index fund having shares (or common-indexed securities) representing a set of entities is provided, with the value contributed by each represented entity tied to a common index (which may be a composite index comprised of a set of indices), rather than being tied to each entity's individual performance. The fund may be configured such that the entities receive upfront liquidity (or consideration) in exchange for subsequent consideration back to the fund with the magnitude of that subsequent consideration being a function of the index. Accordingly, the value of the fund, and thus that of the fund shares, is also a function of the index. The fund shares could be offered publicly, privately or some combination thereof, or not at all, and could be offered in different classes.

The common index securities system and method could be implemented as a small business liquid security (SBLS) system and method that enables investment in one or more "small businesses" (or entities) relatively easily. An SBLS system in accordance with this embodiment enables the creation, issuance, trading and management of SBLS shares based on those businesses as an ordinary liquid equity investment tradable on a stock exchange, like shares of any publicly traded company. Since an SBLS fund is a form of a common index fund, the value contributed by each small business (and any other entity represented in the fund) is preferably indexed to, for example, an industry-wide performance index rather than each entity's individual performance. SBLS shares may be traded publicly, privately or some combination thereof, or not at all.

The businesses that participate in the fund may be of any size, so a combination of sizes of businesses may be represented. In the SBLS embodiment, a "small business" may a business defined by certain agencies or governmental regulations as a "small business" based on criteria relating to the size of the business, such as its number of employees, gross revenue, and so on. The phrase "small business" as used herein is also meant to comprise businesses or entities not traded or traditionally tradable as a liquid security, such as: (1) any entity which is generally considered by the financial community as not suitable for an initial public offering (IPO) or public trading, (2) any entity which was once publicly traded, but has since been de-listed, (3) a subsidiary, affiliate of a business, even if that business is traded publicly or privately or (4) any other entity not publicly traded, regardless of size, or profitability, (5) a source of income flowing from one or more individuals or entities, (6) a partnership or joint venture, (7) a university or not-for-profit organization, or (8) any combination of the foregoing. As examples, a start-up company, educational institution, not for profit or charitable institution, or individual or group of individuals may each be a "small business" within the context of the present invention. A fund in accordance with the present invention may represent any of the foregoing, along with businesses having stock that is publicly traded, or tradable.

The fund may represent entities from one or more defined classes. The classes could be industry based, such as a defined class for oil companies, as just one example. As another example, a class may represent a certain sector, or limited number of sectors, of an industry. And changes in an index associated with the fund could represent, in whole or in part, performance or earnings associated with that industry sector or sectors.

FIG. 1 shows a block diagram of a representative common index securities system in accordance with the present invention. In this embodiment, the common index securities system is an SBLS system 100—meaning at least one entity represented by the fund is a small business, as that phrase is used herein. As will be appreciated by those skilled in the art, system 100 could just as easily be a common index securities system that does not include a small business. It will also be appreciated by those skilled in the computer arts and investment arts, that the present invention is not limited to the explicit structure of FIG. 1.

An SBLS fund 130 may specialize in a particular industry sector or sub-sector (collectively "Sector"), shown as Sector A in FIG. 1, as a predefined class. The Sector may be narrowed by having a sub-sector focus, such as a geographical focus based on a country, region, or several countries. The SBLS fund 130 may be created and managed, as shown by arrow 122, by a fund manager 120 (or fund management system), which issues shares 132 against the SBLS fund 130. Shares 132 may be offered publicly, e.g., on an exchange 150, offered privately, or not offered at all. That is, the shares 132 need not ever be offered for trade or listed on an exchange.

The SBLS fund manager 120 forms relationships with many businesses or companies 110 (e.g., businesses A1, A2, . . . An) in at least one class or sector of interest, e.g. Sector A, to form SBLS fund 130. The SBLS fund manager 120 could reach individual business owners through alliances with commercial banks, brokerage firms, leasing companies, franchise companies or other sources of commercial loans. Such distribution, networking and solicitation may be accomplished electronically via the SBLS computer architecture 300 shown in FIG. 3, by more traditional means or by some combination thereof.

The fund manager 120 provides upfront liquidity to each business in the form of cash, marketable securities, or both, as indicated by arrow 112. Additionally, or alternatively, one or more business could receive shares in the SBLS fund, which may later become liquid and/or begin paying distributions. Such businesses 110 could receive SBLS shares 132, whether marketable or not, received by the fund manager 120 via arrow 136. The fund manager 120 may also obtain shares 132' for itself, as indicated by arrow 124. The subset of shares 132' is determined by allocating a number of shares to a company (e.g., A1) based on that company's buy-in and then applying left over amounts from the buy-in to purchase shares 132' for the fund manager 120.

In return for the upfront liquidity provided by the SBLS fund 130 to the companies 110 via arrow 112, the SBLS fund 130 receives subsequent payments from the businesses 110. The subsequent payments may take the form of an ongoing payment stream or a limited number of payments from the businesses, also indicated by arrows 112. The payment stream owed by each business is subject to change according to changes in an index 134 corresponding to the class (or industry sector). In the preferred form, the payment stream owed by each business A1, A2, . . . An 110 would decline in negative economic circumstances and rise in positive economic circumstances—because the index 134 would decline in negative circumstance and rise in positive economic circumstances. But there may be embodiments where a reciprocal relationship is may be implemented for some or all of the SBLS shares. And, in some embodiments a lower cap could be applied to the payment stream, an upper cap could be applied, or both.

Since the businesses 110 can receive shares 132 of the SBLS fund 130, a business A1 can also be an investor, e.g., investor I1. If the SBLS shares 132 are traded, then others can also invest. Regardless, SBLS fund investors 140 (e.g., investors I1, I2, . . . In) receive earnings that change in proportion to changes in the index 134, because each entity's payments are tied to the index. As mentioned above, index 134 may be an index for the overall industry sector or sectors comprising the businesses 110. Because the fund's performance is indexed to the industry, rather than the individual businesses' performance, the investors are not exposed to individual business mismanagement, fraud or other idiosyncratic risk, aside from outright bankruptcy, of individual businesses in the SBLS fund 130. Accordingly, the value of the fund, and that of the fund's shares, and any dividends paid out, are not relative to any individual business' earnings, revenues, expenses, cash flow or other performance or condition measure. To mitigate bankruptcy risk, for example, a guarantor (not shown) may be included in the system of FIG. 1 (or FIG. 2) to back-up the obligations of the companies 110 represented by the fund.

In the small business embodiment, the small business owner can "go public" with a portion of its shares and receive close to a publicly traded level of price to earnings (PE) ratios, while the party that issues the SBLS shares 132 can also realize a profit from the remaining portion of the arbitrage between private business PE ratios and those for publicly traded companies, as explained in greater detail below. Even when there are not small businesses represented by the fund, the same benefits are available to other types of entities and may be preferred to going public—even if available to an entity. Of course, an entity could be publicly traded, and also be represented in a common index fund.

The value of the fund, thus the value of the fund shares, is based on the payments made to the fund by the companies represented in the fund, which is a function of the index. The index 134 may be a published index for the industry sector, if such an index exists, or it could be an index derived from one or more of other relevant parameters, for example: (1) the performance of a set of companies that is representative of the businesses in the fund or an industry associated with the fund, (2) one or more composite indices, (3) performance information related to companies within the fund (e.g., earnings, debt) or the sector or sectors, or (4) generally available economic or financial indicators or rates (e.g., prime interest rate, unemployment, commodity prices, or cost of living). In short, there is no particular constraint placed on the one or more indices used, other than they provide some meaningful relationship to the fund or businesses represented by the fund. Among other things, the index or indices used may be geographically, regionally, politically or nationally oriented.

As will happen from time-to-time, a business, e.g., business A2, may be acquired. In such a case, and if the fund is structured to permit it, the rights and obligations of acquired business A2 can transfer to the new owner of the business A2. Subsequently, A2 (and its new owner) could be released from the fund if it resolves its payment stream obligations. It could also sell back its shares, or continue to hold them. Such provisions are preferably established at fund formation. Otherwise, such an acquisition could force a mandatory elimination or buy-out of A2 from the SBLS fund, which could carry a penalty. During the term a business may wish to pull-out of the fund for other reasons (e.g., to go public on its own). A similar buy-out may be allowed in such cases.

Some benefits of the single industry SBLS fund 130 approach shown in FIG. 1 can include:
1) Each SBLS fund 130 can specialize in one industry sector or sub-sector so investors and analysts can understand and choose investments they like.
2) The SBLS fund 130 takes only industry risk, not idiosyncratic business risk of any individual business in the fund (except, potentially, bankruptcy risk).
3) There are no fraud or management accountability issues regarding the individual businesses in the SBLS fund 130 or, at the very least, they are diluted enough to make them non-factors relative to investing in one business.
4) The individual business owner diversifies away some of his business risk.
5) The individual business owner retains the incentive to run his business for maximum profit because he keeps the entire amount that his profit growth exceeds that of the index.
6) The obligations of the individual business to pay an amount indexed to the performance of it its industry should be acceptable because the small business owner would presume that such obligation will track the individual businesses performance to a large degree.

Figure 2:
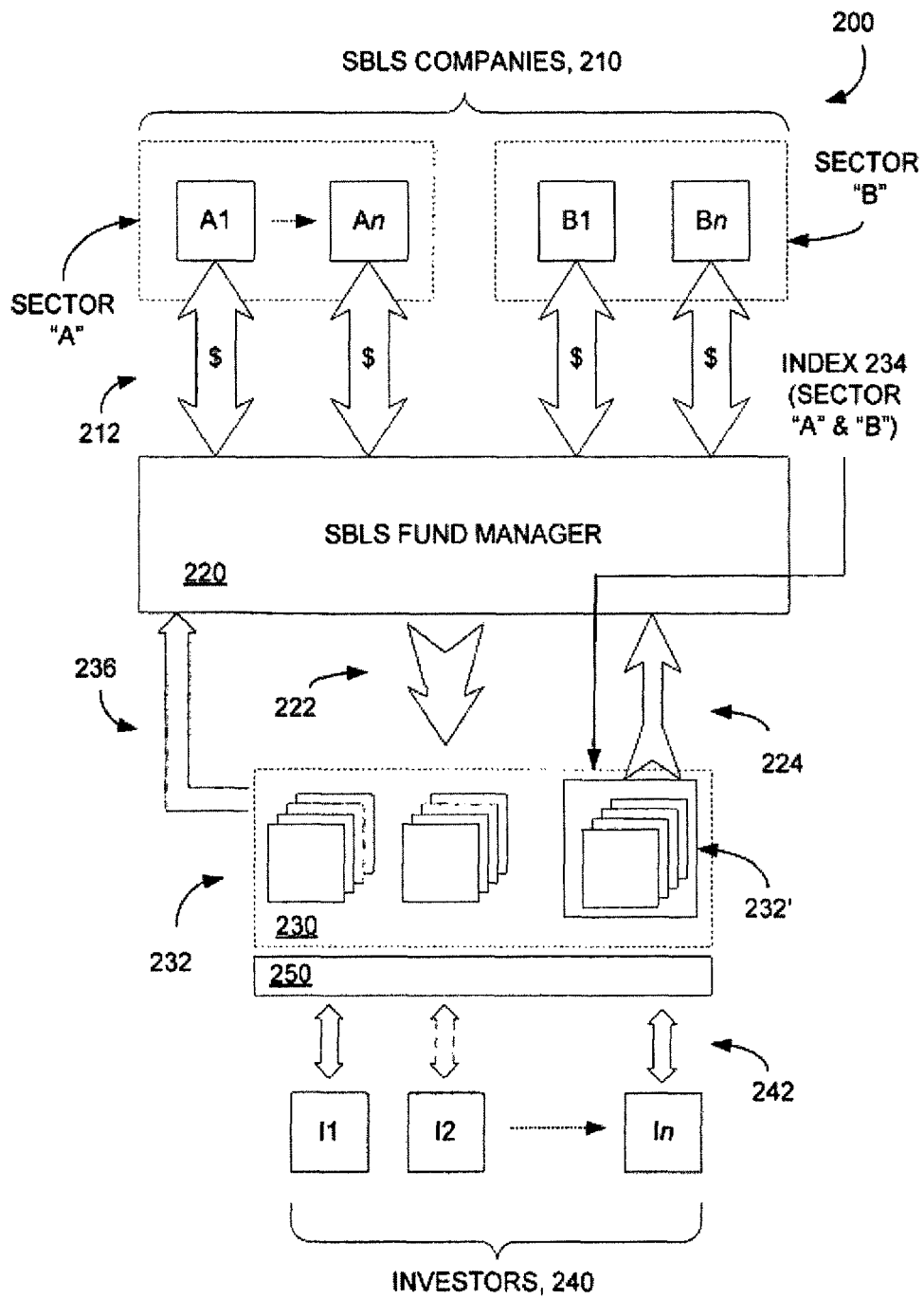
FIG. 2 is a block diagram of an alternate embodiment of a common index securities system, in accordance with the present invention.

In some forms, more than one industry or class may be represented in a SBLS fund, as is shown in FIG. 2. As an example, an SBLS fund 230 could represent two industry sectors A and B having significantly different volatility. In such a case, the SBLS fund 230 would not only be a composite of several companies 210, but also of several sectors or classes, offering to investors 240 a risk/reward opportunity that is a hybrid of the two. The risk/reward could be weighted according to the representation of each sector in the SBLS fund 230. For some investors, this hybrid SBLS fund 230 could provide a more attractive risk/reward than any one industry represented in the SBLS fund could offer by itself.

Otherwise, the SBLS fund 230 functions similar that of the SBLS fund 130 of FIG. 1. That is, SBLS shares 232 are issued against the SBLS fund 230 by the SBLS fund manager 220 (or management system). Because the payments made by the companies in the fund are tied to an index, the value the fund and the SBLS shares 232, and thus any related payouts to investor share holders 240, fluctuates in response to index 234. Index 234 may comprise one or more indices derived from or related to Sectors A and B. The payouts could also be made as a function of a blend of the index 234 and profits of the businesses, or other applicable or predetermined revenue sources or parameters.

The companies 210 from these sectors buy-in and receive upfront liquid assets, such as cash, marketable securities or both, indicated by arrows 212. The businesses could receive SBLS shares 232 via fund manager 220, also indicated by arrow 212, which need not necessarily be liquid. The fund manager 220 may obtain these SBLS shares 232 from the SBLS fund 230 as indicated by arrow 236. In exchange for the upfront liquidity or other assets, the businesses 210 agree to make subsequent payments to the fund, e.g., regular payments based on earnings. The amount of the payments is preferably adjusted according to index 234, which may be any type of index described herein, but having a relationship to the businesses represented in the fund. Therefore, a rise in the index for the industry or industries, or their sectors, causes a corresponding rise in the payments to be made by the companies 210. A corresponding arrangement for payments to decrease in response to a lower than expected index could also be accommodated. In any event, a rise in the companies' payments causes a corresponding rise in the value of the fund, and thus the fund's shares.

The fund manager 220 may also receive a subset of SBLS shares 232', indicated by arrow 224. The subset of shares 232' is determined by allocating a number of shares to a company (e.g., company B1) based on that company's buy-in and then applying left over amounts from the buy-in to purchase shares 232' for the fund manager 220. The SBLS fund's investors 240 purchase shares 232 from the fund 230, e.g., publicly through an exchange 250 or privately. Again, some or all of these investors 240 may be the businesses 210 represented in the SBLS fund 230. The value of the fund, thus the values of the fund shares, is based on the payments made to the fund, along with other market factors, which is based on or related to the index 234. In lieu of, or in addition to, receiving shares 232', the fund manager may receive compensation in other forms, e.g., a portion of the payments made by companies 210.

Exemplary Structure of Arrangement Between a Business and SBLS Fund

This example demonstrates the single sector SBLS fund, but those skilled in the art can easily extrapolate from this example to functioning in a multi-sector SBLS fund. Among the benefits to the businesses are up-front liquidity, as mentioned. Another benefit of the underlying structure of the relationship between the businesses and the SBLS fund 130 is to allow the SBLS fund 130 to share in the financial performance of the business Sector A through payments by individual businesses 110 in the chosen sector and enable fair and attractive tax treatment between the two entities, i.e., SBLS fund 130 and the companies 110 in the fund. In the hybrid or multi-sector SBLS fund, these benefits may be applied to several sectors represented within a single hybrid SBLS fund.

To accomplish these goals, the structure may be debt with some equity-like aspects or it could be all equity. One exemplary structure is:

| | |
|---|---|
| Proportion of Business: | up to 20% |
| Basic Structure: | Equity |
| Payments: | Quarterly payment, floats with profits from business sector |

Form of Payment to Business Owners: Cash, or stock in the SBLS fund 130

Criteria for Accepting Businesses Into the SBLS Fund 130 May Include, as Examples:
1) Verification of correct industry sector
2) Existence of bank loans, or other debt 3) Credit history or worthiness
4) Existence and aging of receivables
5) Personnel issues
6) Availability of collateral
7) Availability of personal guarantees
8) Investor, partner, or other business relationships effecting likelihood of success of business As an example, a new SBLS fund 130 may be formed of companies 110 that are in the business of delivering home heating oil. Therefore, Sector A represents the home heating oil sector. Individual companies will be approached by commercial banks who make an introduction to the fund managers with whom they do business. The companies are screened and the selected companies 110 are offered the opportunity to receive SBLS fund shares 132 in return for paying in up to 20% of their current profits, indexed to a home heating oil delivery company earnings index 134.

For example, if a particular company A1 earns $1 million per year, it could begin by committing to pay in $200,000 per year, see arrow 112. A buy-in ratio is initially set by the fund creator/manager 120 to 15, so A1's payment is deemed to be worth $3 million in shares at market value. In this example, each share 132 in the SBLS fund 130 is initially set to earn $1 per year and the expected trading price of the shares is $20, because the PE is expected to be 20. The PE ratio (e.g., 20), earning per share (e.g., $1), and buy-in ratio (e.g., 15) are all determined initially. As with other securities, the PE ratio and earnings per share are subject to ongoing change. Additionally, it is not necessary that all shares are issued to a company at buy-in; the number of shares could be allowed to float with the performance of the SBLS fund 120.

The earnings per share is a relatively arbitrary figure that need not have any relationship to the sector. The PE ratio may be based on historical performance of the given sector, e.g., a PE of 20 may be about the average for companies in the sector. The buy-in ratio is set by the SBLS fund manager 120 to provide an attractive opportunity to the businesses, while also making the opportunity attractive for the SBLS fund manager 120.

In this exemplary scenario, therefore, the company A1 would receive 150,000 shares, e.g., $3M/$20 per share. This follows the general equation:

(PAYMENT×BI RATIO)/PE=#SHARES TO COMPANY ($200 k×15)/20=150 k shares

However, the $200,000 buy-in paid by company A1 enables the creation of a total of 200,000 shares total, each with earning initially set at $1. Therefore, there are an additional 50,000 shares, determined by the equation:

(PAYMENT/SHARE EARNING)−# SHARES TO COMPANY=# SHARES TO FUND MGR

[$200K/($1/share)]−150,000 shares=50 k shares

These extra 50,000 shares 132' are profits to the manager 120 of the SBLS fund 120, indicated by arrow 124.

Variations on the above approach may also be accommodated. The myriad variations possible include adjusting any of the structure parameters used in the example above, as would be appreciated by those skilled in the investment or financial arts. For example, some possible variations include:

1) The index 134 can be made a function of the revenues of a set of businesses or on business profits within a certain geography.
2) The payment by the businesses to the SBLS fund 120 could vary by each business's revenues or some kind of standardized profits paradigm. For example, the formula could increase buy-in payments to the SBLS fund pay-ins by businesses over time to increase fund value
3) The businesses need not be concentrated solely in one industry, but additionally or alternatively be chosen or classified by geography or size or some other classification.
4) Represent in the SBLS fund not just businesses, but other types of entities, such as professional practices or even individual incomes and then make the index a function of the profession e.g. dentists, baseball players, musicians, actors, CEOs.
5) As mentioned above, as a form of hybrid SBLS fund, a diverse set of businesses may be grouped to form a more balanced fund, potentially reducing industry related risk.
6) The index 134 could be any type relevant index, composite index (e.g., S&P 500, Dow Jones Industrial Average, Nikkei) or combination of indices or other economic parameters or indicators (e.g., interest rates).
7) Interest payments and/or dividend payments could be made based on periodic criteria, event driven criteria (or stimuli), including threshold criteria, or some combination thereof. 8) The SBLS fund could represent, at least in part, bundles of receivables (e.g., present, future or a combination thereof), contract proceeds, or marketable rights (e.g., present, future or a combination thereof).

An example of adjusted criteria is as follows:

| 1) | Proportion of Business: | up to 20% |
| 2) | Basic Structure: | Equity |
| 3) | Payments: | Quarterly payment, floats with profits from business sector |

Computer Architecture

An SBLS system may be embodied in a network of computer devices, which may included wired, e.g. fiber optic, wireless and other communication means. Such computers may include personal computers, servers, workstations, personal digital assistants (PDAs), cell phones, pagers, e-mail devices, and so on. Any of which may process, store, operate on, present, or communicate SBLS related data and execute SBLS functionality. See also FIG. 3 and the related discussion herein.

Figure 3:
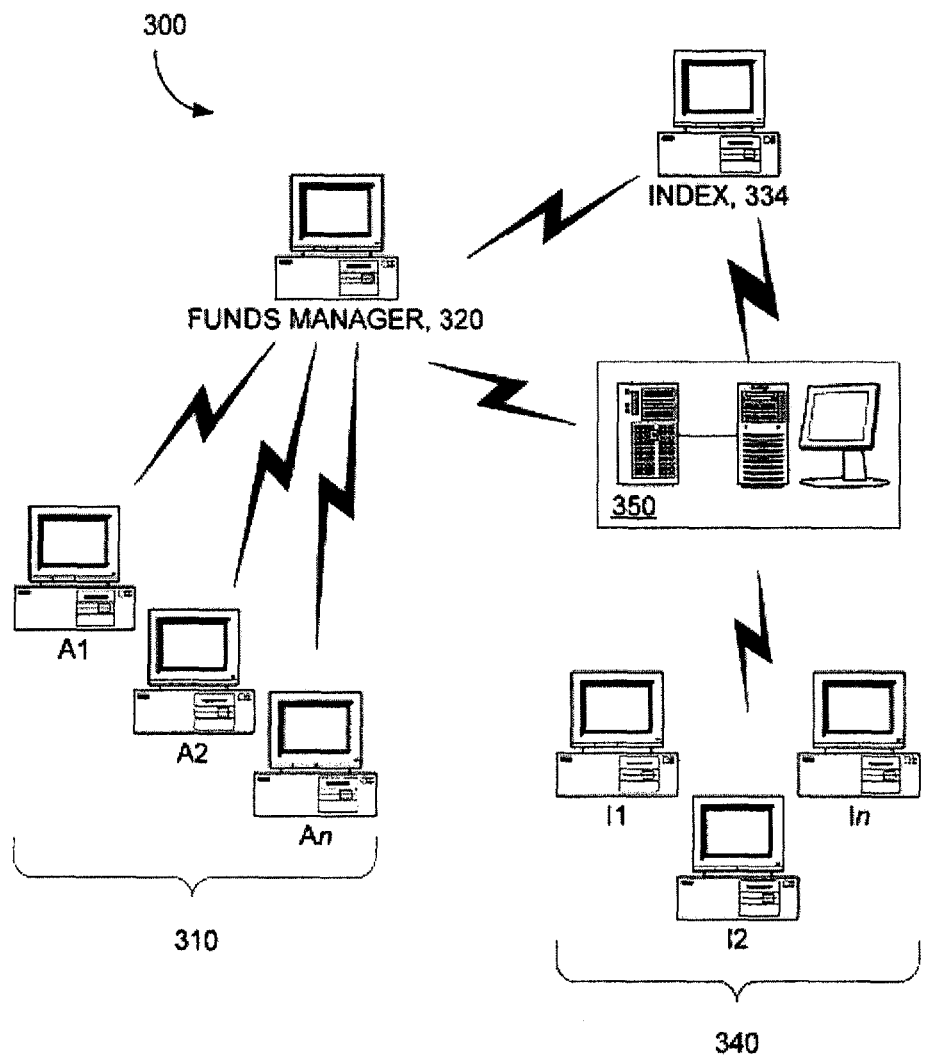
FIG. 3 is a top level embodiment of a computer architecture which could be used to implement the systems of FIG. 1 and FIG. 2.

FIG. 3 provides one possible architecture 300 for implementing an SBLS system and method. In this case, architecture 300 implements the SBLS system 100 of FIG. 1. A funds management system 330 provides the overall administration of the fund, which may include means creating the fund and establishing all of the relevant parameters and selection of the businesses A1, A2, . . . An, and associated systems 310, processing the buy-ins and distributions with the businesses, and interaction with an exchange system 350 for offering, trading, and redeeming the SBLS shares, if required. Investors, using investor systems 340 investors I1, I2, . . . In, may access the exchange 350 for the trading and redeeming of shares. The businesses represented in the SBLS fund 130 may also be considered investors. At least one of the fund management system 350 or exchange system 320 links to index systems 334, which serve as the source or sources of index data for the purpose of influencing or adjusting the value of the payments by companies 110, and therefore the SBLS fund 130.

Functionality of the SBLS funds management system 330 may be embodied in program code executed by one or more processors. The program code and SBLS data may be stored in any known form of computer storage device or system. The SBLS functionality and data may be co-located or distributed among a plurality of systems or subsystems. Similarly, functionality and data of other relevant entities may be embodied in program code, resident in any of a variety of storage devices or systems and executed or accessed by any of a variety of processors.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method that provides liquidity in a plurality of entities, the method carried out by a plurality of computer processors that interact over at least one network and are coupled to at least one computer memory, the method comprising:
    defining the plurality of entities in the at least one computer memory using at least one computer processor;
    designating, in the at least one computer memory, entities from the plurality of entities as belonging to one of a set of classes, wherein the entities include at least one small business, using the at least one processor; and
    for a class including at least one small business:
        electronically receiving an index representative of the class;
        storing data indicating an initial payout to each entity in the class using the at least one processor;
        computing a future payment stream owed by each entity in the class based on the initial payout to each entity the future payment stream of each entity including at least one adjustable payment, using the at least one processor; and
        adjusting the at least one adjustable payment of each entity using the at least one processor in response to a change in the index relative to the performance of such entity.

2. The method of claim 1, further comprising:
    issuing shares whose value is related to values of the future payment stream of each entity.

3. The method of claim 2, further comprising:
    issuing different ones of the shares for different classes from the set of classes.

4. The method of claim 2, further comprising:
    managing a fund including the shares using the at least one processor.

5. The method of claim 4, wherein the at least one processor forms part of a fund management system.

6. The method of claim 2, further comprising:
    electronically trading the shares using the at least one processor.

7. The method of claim 2, wherein the shares are traded via an electronic exchange system.

8. The method of claim 1, wherein the at least one small business includes entities that are not publicly traded.

9. The method of claim 1, wherein the at least one small business includes at least one entity representing at least one income stream.

10. The method of claim 1, wherein the at least one small business includes at least one joint venture.

11. The method of claim 1, wherein the at least one small business includes at least partnership.

12. The method of claim 1, wherein the at least one network includes the World Wide Web.

13. The method of claim 1, wherein the at least one network includes the Internet.

14. The method of claim 1, further comprising:
    the at least one processor generating the index.

15. The method of claim 14, further comprising:
    generating the index from information electronically received over the at least one network from one or more external sources.

16. The method of claim 1, wherein the index is a composite index.

17. The method of claim 1, further comprising:
    the at least one processor applying a cap to the payment stream.

18. The method of claim 1, wherein the cap is an upper cap.

19. The method of claim 1, wherein the cap is a lower cap.

20. The method of claim 1, wherein one of the computer processors form a small business liquid securities system.

* * * * *